June 20, 1961      B. L. SMILEY      2,989,106
SCREW FASTENER LOCKING ARRANGEMENT
Filed Feb. 17, 1958
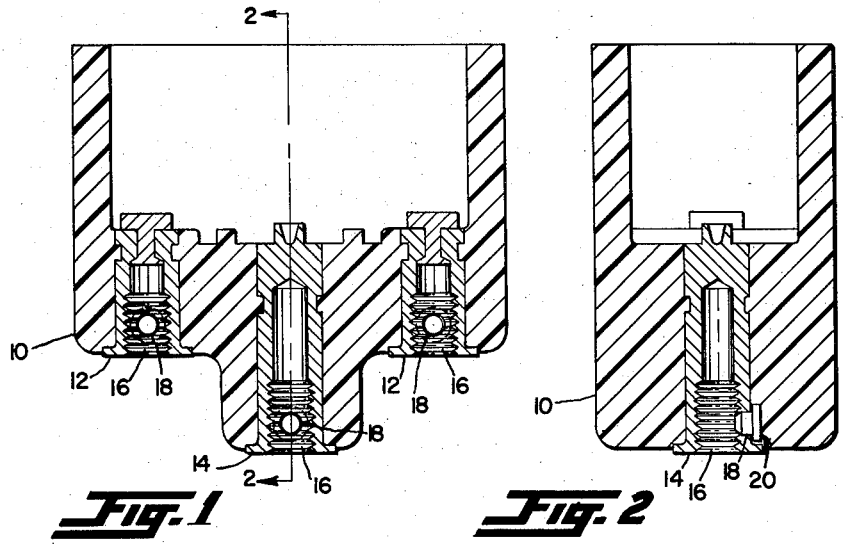
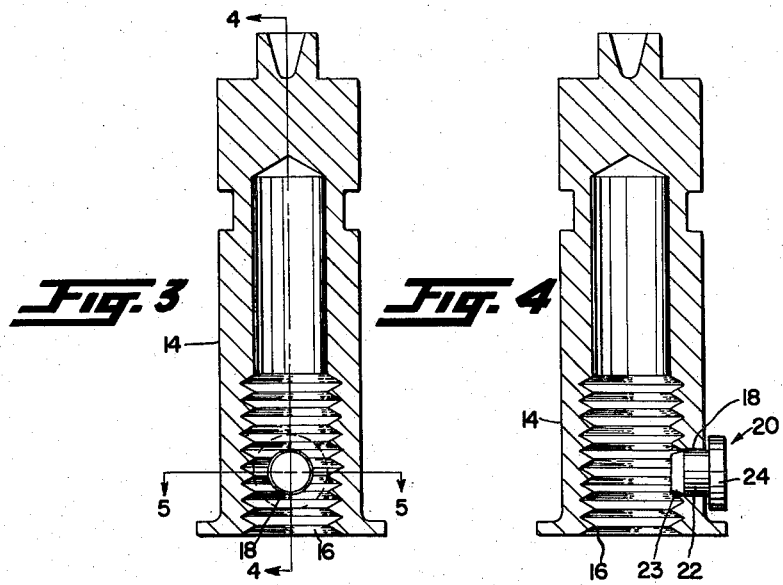
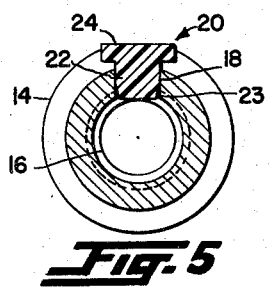
INVENTOR.
BERT L. SMILEY
BY *Philip J. Zwimach*
ATTORNEY 2,989,106
SCREW FASTENER LOCKING ARRANGEMENT
Bert L. Smiley, Freeport, Ill., assignor to Minneapolis-Honeywell Regulator Company, Minneapolis, Minn., a corporation of Delaware
Filed Feb. 17, 1958, Ser. No. 715,821
2 Claims. (Cl. 151—7)

The present invention is directed to a screw fastener locking arrangement wherein a resilient plastic locking member is associated with an internally threaded member for cooperation with an externally threaded member to lock or hold the externally threaded screw member in place when the screw member is disposed within the internally threaded member and engaged with the resilient member.

In many applications, it is desirable to secure an externally threaded member or screw member in an internally threaded member so as to make it nonsusceptible to loosening through vibration of other external forces. One manner of accomplishing this is through the use of a resilient plastic locking member disposed either in the screw member or in the internally threaded member for cooperation with the other member. Where the screw member is frequently inserted and removed from the internally threaded member, the disposition of the resilient member in the screw member is often unsatisfactory, inasmuch as the resilient member can become disassociated therefrom. This is especially true in regard to relatively small diameter screw members. The disposition of the resilient member in the internally threaded member overcomes this shortcoming. One such arrangement utilizes a blind opening in the threaded portion of the internally threaded member, the axis of which is substantially transverse to the axis of the threaded portion of the internally threaded member, wherein a resilient member is disposed. However, in many applications the disposition of the resilient member in the internally threaded member usually requires some form of holding means for maintaining it in place. When the internally threaded member is a nut, and the resilient member is a plug disposed in an opening provided in the nut the axis of which is transverse to the axis of the threaded portion of the nut, a portion of the nut body proximate to the opening can be upset to maintain the resilient member in place. In another application, the resilient member is disposed adjacent the extremity of the threads of the nut and a portion of the nut wall is upset to maintain the resilient member in place. All of the foregoing, while desirable under certain conditions have their limitations. Thus, the disposition and holding of a resilient member in an internally threaded member having a relatively thin wall, such as a terminal insert of the type utilized in relatively small switches, by any of the forementioned arrangements is not feasible.

The present invention is directed to providing a screw fastener locking arrangement especially for use with internally threaded members having relatively thin walls, such as miniature switch terminal inserts, wherein the resilient member is associated therewith. Since the miniature switches mentioned above include molded cases in which the terminal inserts are contained, a new and novel screw fastener locking arrangement has been devised wherein a resilient member or plug includes a first portion which is disposed in and which substantially occupies an opening located in a threaded wall portion of the insert whose axis is substantially transverse to the longitudinal axis of the terminal inserts and a second portion extending beyond the insert, so that the nonresilient material forming the case of the switch molded thereabout maintains the insert and the plug in place. By utilization of this arrangement, no external fastening means are required for the plug. Further, since the molded material of the case completely envelops that portion of the resilient member extending beyond the insert, there is no possibility of outward flow of the plug with respect to the longitudinal axis of the insert. It has been observed that where the plug is limited against outward flow the holding power of the screw fastener locking arrangement upon repeated insertions and removal of the screw member into and from the internally threaded member or terminal insert is far superior to any of the other arrangements previously described above.

Therefore, it is an object of this invention to provide a screw fastener locking arrangement incorporating a resilient locking member in association with an internally threaded member for cooperation with an externally threaded member wherein no integral holding means are required in the internally threaded member to maintain the resilient member in place;

It is another object of this invention to provide a screw fastener locking arrangement incorporating a resilient locking member disposed in and extending outwardly beyond an opening located in a threaded wall portion of an internally threaded member for cooperation with an externally threaded member wherein the internally threaded member and the resilient member are utilized with a nonresilient member molded thereabout which acts to maintain the resilient member in place;

It is a further object of this invention to provide a screw fastener locking arrangement incorporating a resilient locking member disposed in and extending outwardly beyond an opening located in a threaded wall portion of an internally threaded member for cooperation with an externally threaded member wherein the internally threaded member and the resilient member are utilized with a nonresilient member molded thereabout which acts to maintain the resilient member in place and wherein due to the molding material disposed thereabout no outward flow of the resilient member is possible, thereby resulting in better repeatability of the arrangement;

These and other objects will become more apparent from a reading of the following specifications and appended claims in which:

FIGURE 1 is a sectional view of a switch case including a plurality of thin walled terminal inserts;

FIGURE 2 is a sectional view of the switch case of FIGURE 1 taken along the lines 2—2 thereof;

FIGURE 3 is an enlarged sectional view of one of the terminal inserts;

FIGURE 4 is a sectional view of the terminal insert of FIGURE 3 taken along the lines of 4—4 thereof; and FIGURE 5 is a sectional view of the terminal insert of FIGURE 3 taken along the lines 5—5 thereof.

In FIGURES 1 and 2, a switch case 10 of rigid molded plastic material, such as Bakelite, Melmac, or similar material is shown. Molded in the switch case 10 are a pair of contact bearing, conducting terminal inserts 12 and a common conducting terminal insert 14. Each of the inserts 12 and 14 is tubular in shape and includes a threaded portion 16 at the lower extremity thereof for cooperation with a screw member, not shown. Openings 18, the axes of which are substantially transverse to the longitudinal axes of the inserts 12 and 14, are provided in the threaded portion 16 of the inserts. In each of the openings 18 there is disposed a resilient plastic plug 20 formed of nylon or similar resilient material.

The structure of the terminal inserts and plug is more clearly disclosed in FIGURES 3-5. There, the terminal insert 14 and the particular association of a plug 20 therewith is shown. The plug 20 is comprised of a shank portion 22 having a tapered extremity 23 which extends into the threaded opening 16 some distance past the major diameter of the threads. The shank 22 is cylindrical in form, as is the opening 18 in the wall of the insert. The size of the shank 22 is so chosen so that it substantially fills the opening 18. The taper portion 23 is merely provided so that the plug 20 can be easily disposed in the opening 18. The plug 20 also includes a shoulder portion 24 which is disposed adjacent the outer perimeter of the insert 14, for purposes which will become apparent later.

In preparing the inserts 12 and 14 for molding, it is only necessary to dispose the plugs 20 in the openings 18 whereupon the inserts are placed in a switch case mold so that the threaded portions 16 of the inserts are associated with pins in the mold. These pins are of a diameter slightly less than the minor diameter of the threads. The pin thus acts to limit the movement of the plugs 20, thereby acting to accurately located the plugs. With the inserts so located and the mold closed Bakelite, Melmac, or another suitable molding material is introduced into the mold surrounding the inserts and plugs and providing the switch case shown in FIGURES 1 and 2. The molding material completely envelops the shoulders 24 of the plugs 20 thereby acting to hold the plugs 20 against either inward or outward movement. Further, the complete envelopment of the shoulders 24 and those portions of the shanks 22 extending beyond the perimeters of the inserts 14 eliminates any possibility of outward flow of the plugs 20 upon the introduction of screw members in the threaded portions 16 with consequent engagement with the extremities 23.

Thus, it can be seen that by utilizing the construction described above, a screw fastener locking arrangement has been provided wherein the noresilient material molded about the internally threaded member acts to hold the internally threaded member and the resilient member in place and further acts to eliminate any possibility of outward flow of the resilient member due to the action of an externally threaded member acting in cooperation therewith.

While the single embodiment has been shown with the shoulder portion of the plug disposed a finite distance from the perimeter of the terminal insert, it is obvious that the shoulder could be disposed against the perimeter of the insert to locate the plug and specifically the extremity extending into the threaded portion, rather than utilizing the pin arrangement described above. Further, it is possible to eliminate the shoulder completely and merely extend the shank portion of the plug outwardly so that the molding material can flow thereabout and hold the entire plug in place. If the shoulder is eliminated, it may be desirable to notch, serrate or otherwise deform the plug to increase the holding power between the molded material and the plug.

While only one modification of the screw fastener locking arrangement has been shown, other modifications are possible and the scope of the invention should be determined from the following claims, in which,

I claim:

1. A screw fastener locking arrangement comprising: a thin walled metal sleeve including an internally threaded portion, said sleeve having a cylindrical opening extending transversely through a threaded wall portion thereof, a resilient plastic plug including a first portion disposed in and substantially filling the opening in said sleeve and extending inwardly beyond the major diameter of the threads of said threaded portion, and a second portion extending outwardly beyond said sleeve and including an irregularity spaced from said sleeve, and a nonresilient material molded about and engaging said sleeve and the second portion of said plug including the irregularity, to secure said plug in a predetermined axial position with respect to said sleeve irrespective of the position of said irregularity with respect to said sleeve so that said nonresilient material acts to prevent axial displacement of said plug in either direction.

2. A screw fastener locking arrangement, the combination comprising: a sleeve including an internally threaded portion, said sleeve having an opening through a threaded wall portion, the axis of said opening being substantially transverse to the longitudinal axis of said sleeve; a resilient plastic plug including a first portion disposed in and substantially filling said opening and an extremity thereof extending inwardly beyond the major diameter of the threads of said threaded portion and a second portion having a shoulder displaced from the outer perimeter of said sleeve; and a nonresilient plastic material molded about said sleeve and the second portion of said plug; said nonresilient material extending around the shoulder of the second portion of said plug on both sides of said shoulder so that said molded material acts to limit movement in either direction of said plug with respect to said sleeve and to eliminate any possibility of outward flow of said plug upon a screw member being disposed in said threaded portion and engaging the extremity of the first portion of said plug.

References Cited in the file of this patent

UNITED STATES PATENTS

| | | |
|---|---|---|
| 2,072,850 | Audre | Mar. 9, 1937 |
| 2,119,744 | Heyman | June 7, 1938 |
| 2,462,603 | Boots | Feb. 22, 1949 |
| 2,499,104 | Lovell | Feb. 28, 1950 |
| 2,725,915 | Johnson | Dec. 6, 1955 |
| 2,832,391 | Clark | Apr. 29, 1958 |
| 2,880,830 | Rohe | Apr. 7, 1959 |

FOREIGN PATENTS

| | | |
|---|---|---|
| 665,544 | Great Britain | Jan. 23, 1952 |